Aug. 5, 1969  D. D'EUSTACHIO ET AL  3,459,630
ARCUATELY SHAPED CELLULAR GLASS ARTICLE
AND METHOD OF MAKING THE SAME
Filed Sept. 23, 1965
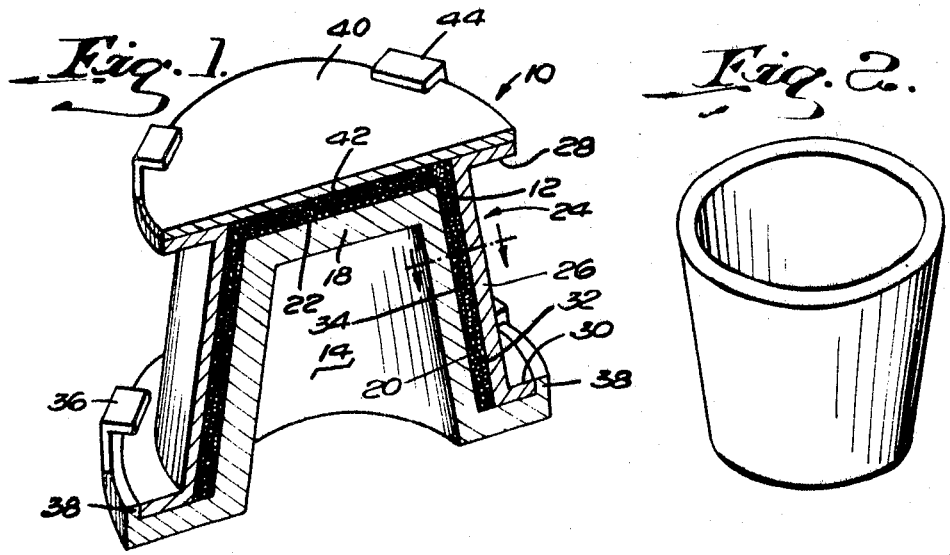
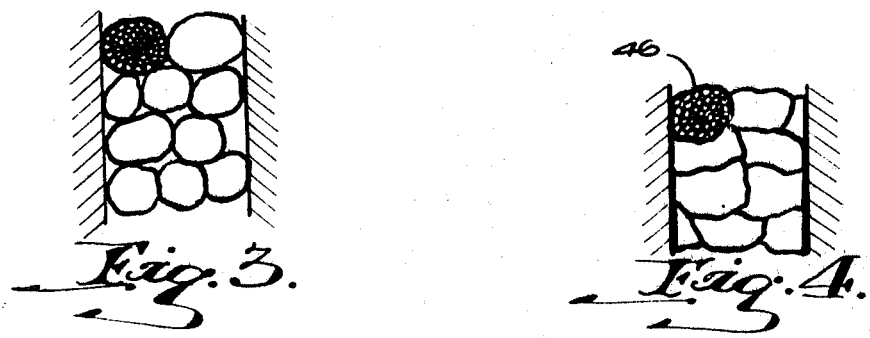
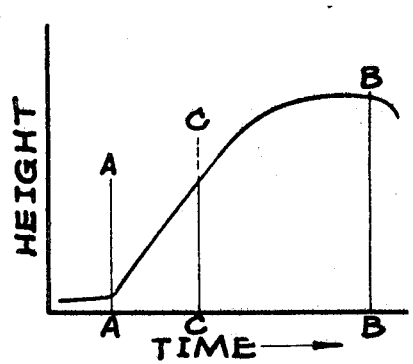
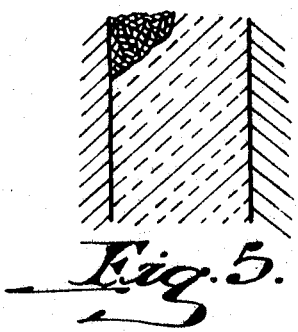
INVENTORS.
DOMINIC D'EUSTACHIO,
HOWARD E. JOHNSON.
BY Stanley J Price
their
ATTORNEY.

United States Patent Office 3,459,630
Patented Aug. 5, 1969

3,459,630
ARCUATELY SHAPED CELLULAR GLASS ARTICLE AND METHOD OF MAKING THE SAME
Dominic D'Eustachio, Pittsburgh, and Howard E. Johnson, Trafford, Pa., assignors to Pittsburgh Corning Corporation, Port Alleghany, Pa., a corporation of Pennsylvania
Filed Sept. 23, 1965, Ser. No. 489,565
Int. Cl. B32b 17/00, 5/16
U.S. Cl. 161—168                                  5 Claims

ABSTRACT OF THE DISCLOSURE

A shaped article having an arcuate surface of cellular glass formed from multicellular glass nodules and a process for making the shaped article. A mixture of particulate glassy materials and a cellulating agent is pelletized and the pellets are thereafter heated to an elevated temperature sufficient to partially cellulate the pellets to form discrete partially cellulated nodules. The partially cellulated nodules are placed in a mold cavity and heated to an elevated temperature to further cellulate the partially cellulated nodules so that the nodules fuse to each other and distort to substantially fill the interstices between adjacent nodules and form a unitary shaped article having an arcuate surface.

---

This invention relates to a shaped cellular glass article and the method of making the same, and more particularly to a shaped cellular glass article formed from partially cellulated cellular glass nodules.

Multicellular glass has been made in the past by processes disclosed in U.S. Patents Nos. 2,123,536, 2,611,712, 2,775,524, 2,860,997, 2,955,049, and 2,946,643. This prior art teaches the making of cellular glass blocks for thermal insulation and the like. The process includes admixing powdered material with a cellulating agent and partially filling a rectangular pan or mold with the powdery admixture. The pan or mold is thereafter heated until the powdery admixture softens, coalesces and the cellulating agent reacts to bloat or cellulate the admixture and produce a bun of multicellular glass. The bun is then annealed and cut or trimmed into slabs or blocks for use as an insulating material. Shaped articles such as annular pipe coverings are formed from the blocks or buns of cellular glass by cutting and trimming the block of cellular glass to the desired shape. This process of forming shaped articles from the multicellular glass blocks is expensive, time consuming and wastes a substantial amount of the multicellular glass at trim loss.

Multicellular glass has many desirable properties that are useful in shaped articles. For example, multicellular glass is dimensionally stable, has a relatively low density and low thermal conductivity. There is a need, therefore, for a relatively inexpensive process to produce shaped articles from multicellular glass.

Recently a process has been developed, as is described in copending application Ser. No. 297,023 entitled "Cellular Glass Nodules," now patent No. 3,354,024, granted on Nov. 21, 1967 for inexpensively making substantially spherical nodules of cellular glass. The nodules have substantially the same desirable physical properties as the blocks of multicellular glass produced by the process described in the prior art. The process for making the multicellular glass nodules is less expensive than the process for making blocks of multicellular glass as has been the practice in the past, and it is now possible to make multicellular glass of preselected sizes ranging from, for example, nodules having a diameter of less than $\frac{1}{16}$" to nodules having a diameter of more than $\frac{3}{4}$" and of preselected densities ranging from less than 6 pounds per cubic foot to more than 30 pounds per cubic foot.

With the versatility of the process described in copending application Ser. No. 297,023, it has been discovered that it is now possible to control the degree of cellulation imparted to the multicellular glass nodule. For example, where the powdery admixture has a density of between 70 and 85 pounds per cubic foot it is possible to partially cellulate the multicellular glass nodule so that it expands to approximately three times the size of the pellet of powdery material and has a density of between about 40 to 50 pounds per cubic foot. Thereafter, when the partially cellulated multicellular glass nodule is again subjected to an elevated cellulating temperature the cellular glass nodule will further cellulate and increase in volume to between six and ten times the volume of the uncellulated pellet of powdery material. The multicellular glass nodule can be cellulated to provide a nodule with a density below 10 pounds per cubic foot.

Briefly, the invention herein described is directed to a shaped article formed from multicellular glass and the method for making the same. It has been proposed to fill a mold cavity with a mixture of powdered glass and cellulating agent. This method is satisfactory if the mold has a very simple shape, a rectangular block for example, and where the rise of the cellulating glass in filling the mold is a fraction of the lateral dimensions of the cellulating mass. But the doughy character of the rising foam is such that it cannot satisfactorily fill narrow passages. We have discovered, however, that when the passages are filled with agglomerates so arranged that void spaces are approximately uniformly distributed throughout the mold cavity, the agglomerates, when subjected to heating to produce further cellulation, will flow together filling the voids and healing the joints to produce a uniform, shaped cellulated mass. In addition, we have discovered that the cellulating time when using agglomerates as the starting material for cellulation is one-third to one-half of that required when using loose powder as the starting material. Accordingly, a mold cavity is filled with agglomerates or pellets of the powdery material either in an uncellulated form or as partially cellulated nodules. The mold cavity, because of the shape of the agglomerates or nodules, contains a substantial amount of void space between the adjacent contiguous nodules and the mold cavity walls. The mold is then heated to an elevated temperature and cellulation of the agglomerates or nodules takes place. The nodules soften, cellulate, distort and fill the void spaces therebetween. Further cellulation of the nodules within the mold expands the nodules to an extent that they lose their individual identity and a unitary shaped article of multicellular glass having the configuration of the mold is formed.

Accordingly, the principal object of this invention is to provide an inexpensive process for making shaped articles of multicellular glass.

Another object of this invention is to provide a method for making a shaped article from partially cellulated substantially spherical nodules.

These and other objects and advantages of this invention will be more completely disclosed and described in the following specification, the accompanying drawings and the appended claims.

In the drawings:

FIGURE 1 is a perspective view partially in section of a mold device suitable for forming shaped cellular glass articles.

FIGURE 2 is a perspective view of a cup shaped container formed from multicellular glass.

FIGURE 3 is a diagrammatic view in section taken along the line 3—3 of FIGURE 1 illustrating the manner in which the partially cellulated cellular glass nodules appear in the annular mold cavity.

FIGURE 4 is a diagrammatic view similar to FIGURE 3 illustrating the manner in which the partially cellulated cellular glass nodules illustrated in FIGURE 3 expand and distort when the mold is heated to an elevated temperature.

FIGURE 5 is a view similar to FIGURES 3 and 4 illustrating in section a portion of the multicellular glass shaped article.

FIGURE 6 is a graphical representation of the time required to cellulate multicellular glass at a predetermined elevated temperature and the volumetric change during cellulation.

In U.S. patent application Ser. No. 297,023 entitled, "Cellular Glass Nodules," a process for making multicellular glass nodules is described. By this process conventional lime soda glass is admixed with a finely divided carbonaceous material and comminuted to a relatively fine powder. Materials other than finely ground glass, when specially treated, may be used as either added constituents or as a substitute for the finely ground glass. For example, materials such as fly ash, silica or admixtures thereof, and metal oxides may be used in lieu of conventional formulated glass materials. For example, the following constituents present in the following range may be used.

| | Parts by weight |
|---|---|
| Fly ash | 0–90 |
| $SiO_2$ | 45–80 |
| A fluxing agent selected from the group consisting of alkali metal carbonates, alkali metal borates, alkali metal chlorides and mixtures thereof | 10–50 |
| Oxygen producing agent reducible by carbon | 0.2–5 |

The weight proportions of silica and oxygen producing agent include the silica and oxygen producing agent that may be present in the fly ash. Glassy materials having an approximate analysis within the following range have also been found suitable.

| | |
|---|---|
| $SiO_2$ | 40–100 |
| $Al_2O_3$ | 0.0–30 |
| $SO_3$ | 0.0–30 |
| $Na_2O$ | 0–40 |
| $CaO$ | 0–30 |
| $B_2O_3$ | 0–20 |
| $Fe_2O_3$ | 0–5 |

The cellulating agent may be any suitable material that reacts with another constituent of the admixture to form a gas at an elevated temperature where the glass has softened. The gas forms bubbles or cells within the softened admixture. A suitable cellulating agent comprises carbon in the form of finely divided carbon black, lamp black, coal, coke silicon carbide or the like.

The admixture of finely divided glass and cellulating agent is ground in a suitable comminuting device such as a ball mill or the like to a fine powder. Agglomerates are thereafter formed from the powdered mixture. For example, the admixture may be pelletized in a conventional pelletizing device using any suitable binder such as water or a water solution containing a small amount of sodium silicate, sodium borate or boric acid. The agglomerates or pellets are dried and are coated with a controlled amount of a suitable parting agent such as $Al_2O_3$ or the like. The coated pellets are thereafter heated to an elevated temperature of between about 1400° F. and 3330° F. preferably at a temperature which brings the viscosity of the glassy material within the range $10^4$ to $10^7$ poises for a sufficient period of time to permit the discrete pellets to heat, soften and cellulate. Nodules having a density of 6 pounds per cubic foot have been made by the above process.

For making shaped articles the heating process may be controlled so that pellets are partially cellulated and the nodules of partially cellulated glass have a density of between 40 and 50 pounds per cubic foot. The volume of the partially cellulated nodules increases by a factor of about two when compared with the uncellulated agglomerates. Where desired, the pellets may be retained at the elevated cellulating temperature for a sufficient period of time to cause the pellets to cellulate to an extent that they have a density of about 25 pounds per cubic foot and have increased in volume by a factor of four when compared with the uncellulated pellets.

It is preferred that the pellets be cellulated in a rotary kiln wherein the pellets are subjected to a tumbling action while they are heated to the elevated cellulating temperature, the temperature preferably chosen to bring the viscosity of the glassy material in the range $10^4$ to $10^7$ poises.

The tumbling action permits the pellets to remain discrete throughout the cellulation process. The discrete partially cellulated pellets are removed from the rotary kiln heating device. A suitable mold device, as is illustrated in FIGURE 1 and generally designated by the numeral 10, is preferably formed from a material that is non-wettable by molten glass. For example, mold parts formed of graphitic material are suitable. The internal surfaces or cavity of a conventional metal mold may be coated with a suitable parting agent such as $Al_2O_3$ in the form of the hydrate $Al_2O_3:3H_2O$. The coating of parting agent prevents the molten glass from adhering to the metal surfaces and the shaped article can be readily released from the components of the mold.

For illustrative purposes the mold 10 has a cup shaped cavity generally designated by the numeral 12 for molding cup shaped articles similar to the container illustrated in FIGURE 2. It should be understood, however, that the mold cavity may have any desired configuration to form shaped articles.

The mold 10 has a cup shaped core element 14 with a lower annular flange and a top horizontal wall 18. The external surface 20 of the core element 14 is frusto conical in shape and the upper surface 22 of the top horizontal wall 18 is substantially planar. A cavity element generally designated by the numeral 24 has a frusto conical body portion 26, an upper annular flange 28 and a lower annular flange 30. The internal surface 32 of the cavity element 24 is frusto conical in shape and has substantially the same configuration as the external surface 20 of core 14. The cavity element 24 is so dimensioned that a frusto conical cavity 34 is formed between the surfaces 20 and 32 of the respective core and cavity elements. A suitable clamping device 36 secures the core and cavity elements 14 and 24 to each other. The core element flange has an annular upturned portion 38 that properly spaces the cavity element 24 relative to core 14 to provide the annular frusto conical space 34 therebetween.

A top plate 40 is positioned in overlying relation with the flanges 28 of cavity element 24 to provide an upper surface 42 for the mold cavity 12. The surface 42 is parallel to and spaced from the horizontal planar surface 22 of top horizontal wall 18. A suitable clamping device 44 secures the plate 40 to the cavity element flanges 28.

The cavity 12 is filled with partially cellulated cellular glass nodules 46 by any suitable means. Preferably the partially cellulated nodules are placed in the mold cavity while still hot; however, for certain applications it may be more convenient to allow the nodules to cool before they are introduced into the mold cavity. The partially cellulated nodules 46 are substantially spherical in shape and are in contiguous relation with adjacent nodules and with the surfaces 20 and 32 of the core and cavity elements. Because the partially cellulated nodules are substantially spherical in shape and substantially the same size, the mold cavity 12 contains about 40 percent void space. The mold 10 with the cavity 12 filled with the partially cellulated nodules 46 is heated to an elevated temperature of between about 1400° F. and 3300° F. and preferably to a temperature to bring the viscosity of the glassy material to a viscosity in the range of $10^4$ to $10^7$ poises. The mold 10 is held at this elevated temperature for a sufficient period of time for the partially cellulated nodules to further cellulate and expand. During the further cellulation and expansion the substantially spherical nodules 46 distort to fill the adjacent void spaces as is illustrated in FIGURE 4.

The individual discrete nodules 46 upon further cellulation lose their individual identity and blend into a unitary mass of multicellular glass, as is illustrated in FIGURE 5. After the discrete nodules have formed a unitary mass of multicellular glass, the mold 10 is cooled sufficiently to rigidify the multicellular glass shaped article and the multicellular glass shaped article is removed from the mold by conventional means. The shaped article may thereafter be annealed to remove the stresses present in the multicellular glass.

By the above described process it is now possible to form shaped articles consisting essentially of multicellular glass having preselected densities as will be hereinafter illustrated in the examples. By controlling the degree of partial cellulation of the nodules fed to the mold cavity, it is possible to control the density of the shaped article.

The following examples illustrate this invention but are not intended as limitations thereof.

EXAMPLE I

An admixture of finely divided formulated glass and about 0.20 percent by weight of finely divided carbon black were thoroughly mixed and formed into pellets having a diameter of about $1/16''$ and a density of about 83 pounds per cubic foot. The pellets were heated to a temperature of about 1600° F. and maintained at this elevated temperature for a period of about two minutes and the pellets formed partially cellulated nodules having an actual density of about 43 pounds per cubic foot and a diameter of about $3/32''$. The mold cavity was filled with the partially cellulated nodules having the above actual density of 43 pounds per cubic foot and diameter of $3/32''$. The mold cavity was closed and the mold was placed in an electric furnace at 1575° F. The mold was held at this temperature for about 10 minutes. The temperature was thereafter lowered to 1500° F. and the mold was held at the decreased temperature for about 10 minutes. The mold was cooled sufficiently to permit the rigidification of the shaped article therein and the shaped article of multicellular glass was removed from the mold and annealed. The shaped article had an actual density of about 25 pounds per cubic foot and a thermal conductivity of about 0.45 B.tu./hr./sq. ft./°F./in. at 75° F.

EXAMPLE II

An admixture of finely divided formulated glass and about 0.20 percent by weight of finely divided carbon black were thoroughly admixed and formed into pellets having a diameter of about $1/16''$ and a density of about 83 pounds per cubic foot, as in Example I. The pellets were heated at the same temperature as in Example I, maintained at the elevated temperature until the pellets formed partially cellulated nodules having the same density and diameter as in Example I, and the mold cavity filled with the partially cellulated nodules. The mold cavity was closed and the mold was placed in an electric furnace at a temperature of 1625° F. for a period of 15 minutes. Then, as in Example I, the temperature was lowered to 1500° F. and the mold was held at that temperature for about 10 minutes. The mold was cooled sufficiently to permit rigidification of the shaped article therein and the shaped article was removed from the mold and annealed. The shaped article had substantially the same actual density of 25 pounds per cubic foot as in Example I.

EXAMPLE III

An admixture of finely divided formulated glass and about 0.20 percent by weight of finely divided carbon black were thoroughly admixed and formed into pellets having a diameter of about $1/16''$ and a density of about 80 pounds per cubic foot, as in Example I. The pellets were heated at the same temperature as in Example I, maintained at the elevated temperature until the pellets formed partially cellulated nodules having an actual density of 20 pounds per cubic foot and a diameter of about $1/8''$, and the mold cavity was filled with the partially cellulated nodules. The mold cavity was closed and the mold was placed in an electric furnace at 1575° F. and held at this temperature for about 10 minutes, as in Example I. The temperature was thereafter lowered to 1500° F., the mold was held at that termperature for about 10 minutes, then cooled sufficiently to permit rigidification of the shaped article therein and the shaped article was removed from the mold and annealed. The shaped article had an actual density of about 16 pounds per cubic foot.

EXAMPLE IV

An admixture of finely divided formulated glass and about 0.20 percent by weight of finely divided carbon black were thoroughly admixed and formed into pellets having a diameter of about $1/16''$ and a density of about 83 pounds per cubic foot, as in Example I. The mold cavity was filled with the uncellulated pellets, closed and placed in an electric furnace at 1300° F. The temperature was raised to 1550° F. and held at that temperature for a period of 20 minutes. The mold was then cooled sufficiently to permit the rigidification of the shaped article therein and the shaped article was removed from the mold and annealed. The shaped article had an actual density of about 50 pounds per cubic foot.

Other shaped articles were made according to the process described that had densities of between about 10 pounds per cubic foot to 30 pounds per cubic foot and a thermal conductivity between about 0.40 and 0.50 B.t.u./hr./sq.ft./°F./in. at 75° F.

From the above examples it is apparent that shaped articles consisting of multicellular glass may be molded from either pellets of uncellulated admixtures of finely divided glassy materials and a cellulating agent, or from nodules of partially cellulated glass. The pellets or partially cellulated nodules may have an actual density of between 80 and 16 pounds per cubic foot and the shaped article may have a density of between 50 pounds per cubic foot and 10 pounds per cubic foot. The relative size of the pellets or partially cellulated glass nodules depends on the shaped article being made therefrom. Where the mold cavity is relatively thin or narrow, small pellets or partially cellulated nodules having a diameter of between about $1/16''$ and $3/32''$ may be used. Where, however, the mold cavity is substantial, larger sized pellets or partially cellulated nodules may be used. The preferred size of the pellets for use in relatively narrow mold cavities have a range capable of passing through a screen having 0.742'' openings and being retained on a screen having 0.0164'' openings. The pellets have a density of about between 70 and 85 pounds per cubic foot. The preferred temperature at which the pellets are partially cellulated is the temperature where the viscosity of the glassy material is in the range of $10^4$ to $10^7$ poises. The degree of cellulation of the pellets, as previously stated, depends on the desired density of the shaped article. A preferred size of the partially cellulated nodules is such that the nodules pass through a screen having 0.883'' openings and are retained on a screen having 0.0195'' openings. The density of the partially cellulated nodules can range between about 80 pounds per cubic foot, i.e. substantially the density of the pellets, and 16 pounds per cubic foot with a preferred density range between 50 pounds per cubic foot and 16 pounds per cubic foot.

Where it is desired to provide a nonglassy surface for the container, a liner such as a metal or iron alloy foil or the like may be applied to the surface 20 of core 14 before the mold cavity is filled with the partially cellulated nodules. Thereafter the multicellular glass nodules, upon further heating, will soften and adhere to the liner. Where it is desired to coat a surface with an organic liner, any suitable organic thermoplastic resin may be applied to a surface of the container. It should be noted where an organic thermoplastic resin is applied to the inner surface of the container, the external surface of the container may be subjected to elevated temperatures and the desirable insulating properties of the container will prevent the decomposition of the organic thermoplastic material coating within the container.

FIGURE 6 is a graphical representation of a typical rate of rise curve for multicellular glass. The height of free rise of the multicellular glass expressed in inches is the ordinate of the graph, and the time the material is subjected to the elevated temperature is the abscissa of the graph. The cellulation phenomena can be conveniently expressed as having a nucleation region to the left of the vertical line A—A where the powdery materials sinter and melt and little, if any, cellulation occurs. The region of cellulation may be defined as the area between vertical lines A—A and B—B where cellulation of the glassy materials occurs. The area to the right of line B—B may be defined as the region of collapse. It should be understood that at different cellulation temperatures the rate of rise curve will have different configurations. For example, where the powdery material is subjected to a lower cellulation temperature, the time required for complete cellulation will increase, and conversely where the material is subjected to a higher celulation temperature, the time for complete cellulation will decrease accordingly. In the previously described process, partially cellulated glass nodules, that is nodules that have expanded or cellulated to an extent that they are on the left side of line B—B in FIGURE 6, may be used. It is preferred, however, that partially cellulated nodules that have cellulated to an extent that they are on the left side of the line C—C be used so that the partially cellulated nodules are capable of additional cellulation and expansion to fill the remaining voids in the mold cavity. It should be understood the reference to FIGURE 6 is for exemplary purposes only and is not intended to limit the process herein described.

According to the provisions of the patent statutes, the principle, preferred construction, and mode of operation of the invention has been explained, and what is considered to represent its best embodiment has been illustrated and described.

We claim:
1. A method of forming a shaped article having an article having an arcuate surface from discrete multicellular glass nodules comprising the steps of
    admixing particulate glassy materials and a cellulating agent,
    comminuting said admixture to a relatively fine powder,
    agglomerating said admixture with a liquid binder into discrete substantially spherical pellets of a preselected size,
    drying said pellets,
    subjecting said pellets to an elevated temperature sufficient to partially cellulate said pellets and form discrete partially cellulated cellular glass nodules,
    Positioning said discrete partially cellulated cellular glass nodules in a mold cavity without appreciably distorting said partially cellulated cellular glass nodules, and
    heating said discrete partially cellulated cellular glass nodules in said mold cavity to an elevated temperature sufficient to soften said glass materials in said partially cellulated cellular glass nodules to a viscosity of between $10^4$ and $10^7$ poises and further cellulate said partially cellulated cellular glass nodules to thereby further expand said cellular glass nodules to fill the interstices therebetween and form a shaped article of multicellular glass having a density between about 16 pounds per cubic foot and 43 pounds per cubic foot.

2. A method of forming a shaped article having an arcuate surface from discrete multicellular glass nodules comprising the steps of,
    subjecting pellets comprising an admixture of particulate glassy materials and a cellulating agent to an elevated temperature sufficient to partially cellulate said pellets and form discrete partially cellulated cellular glass nodules, said partially cellulated glass nodules having a density of between about 80 pounds per cubic foot and 16 pounds per cubic foot,
    thereafter substantially filling a mold cavity with said discrete partially cellulated cellular glass nodules without appreciably distorting said glass nodules, and
    heating said discrete partially cellulated cellular glass nodules in said mold cavity to an elevated temperature sufficient to soften and reduce the viscosity of said glassy materials to between $10^4$ and $10^7$ poises in said cellular glass nodules and further cellulate said partially cellulated cellular glass nodules to thereby distort and fuse said adjacent glass nodules to each other and form a shaped article of multicellular glass.

3. A method of forming a shaped article having an arcuate surface from discrete multicellular glass nodules comprising the steps of,
    subjecting pellets of an admixture of particulate glassy materials and a cellulating agent to an elevated temperature sufficient to partially cellulate said pellets and form discrete partially cellulated cellular glass nodules, said partially cellulated cellular glass nodules having a bulk density of between 50 pounds per cubic foot and 10 pounds per cubic foot,
    thereafter substantially filling a mold cavity with said discrete partially cellulated cellular glass nodules without appreciably distorting said glass nodules, and
    heating said discrete partially cellulated cellular glass nodules in said mold cavity to an elevated temperature sufficient to soften and reduce the viscosity of said glassy material in said cellular glass nodules to between $10^4$ and $10^7$ poises and further cellulate said cellular glass nodules to fuse said adjacent glass nodules to each other and to distort said cellular glass nodules to substantially fill the interstices between adjacent cellular glass nodules and thereby form a unitary shaped article consisting essentially of multicellular glass and having a density of between about 10 pounds per cubic foot and 30 pounds per cubic foot.

4. A method of forming a shaped article having an arcuate surface from discrete multicellular glass nodules comprising the steps of,
    substantially filling a mold cavity having an arcuate surface with substantially spherical partially cellulated glass nodules so that adjacent nodules are in contiguous relation and have interstices therebetween,
    subjecting said partially cellulated glass nodules in said mold cavity to an elevated temperature of between about 1400° F and 3300° F. for a sufficient period of time to soften said substantially spherical partially cellulated glass nodules and reduce the viscosity to between about $10^4$ and $10^7$ poises and fuse adjacent nodules to each other and to further cellulate and distort said substantially spherical partially cellulated glass nodules to substantially fill the interstices therebetween and form a unitary shaped article having a density of between 16 pounds per cubic foot and 43 pounds per cubic foot and an arcuate surface conforming to the arcuate surface of the mold, and thereafter annealing said unitary shaped article.

5. A unitary shaped article having an arcuate surface consisting essentially of substantially spherical multicellular glass nodules fused to each other and distorted to substantially fill the interstices therebetween, said unitary shaped article having a substatnially uniform cell structure, a density of between 10 pounds per cubic foot and 25 pounds per cubic foot, and a thermal conductivity of between about .400 B.t.u./hr./sq. ft./° F./in. at 75° F. and .450 B.t.u./hr./sq. ft./° F./in. at 75° F.

References Cited

UNITED STATES PATENTS

| | | | |
|---|---|---|---|
| 2,691,248 | 10/1954 | Ford | 65—22 |
| 2,736,142 | 2/1956 | Baumler et al. | 65—22 |
| 3,163,512 | 12/1964 | Schill et al. | 65—22 |
| 3,243,860 | 4/1966 | Whittaker et al. | 65—22 |
| 3,250,603 | 5/1966 | Schott | 65—22 |

S. LEON BASHORE, Primary Examiner

E. R. FREEDMAN, Assistant Examiner

U.S. Cl. X.R.

65—18, 21, 22; 106—41